Jan. 1, 1952     S. H. E. GARSIDE     2,581,250
POWER ASSISTED CONTROL
Filed Aug. 28, 1950
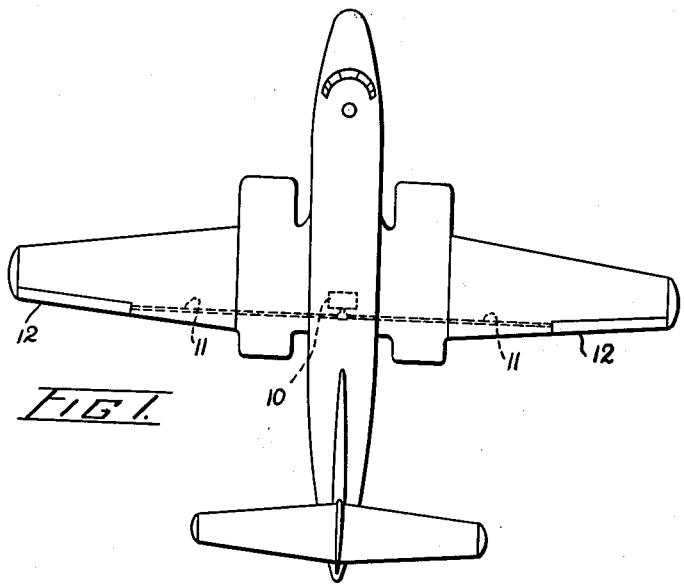
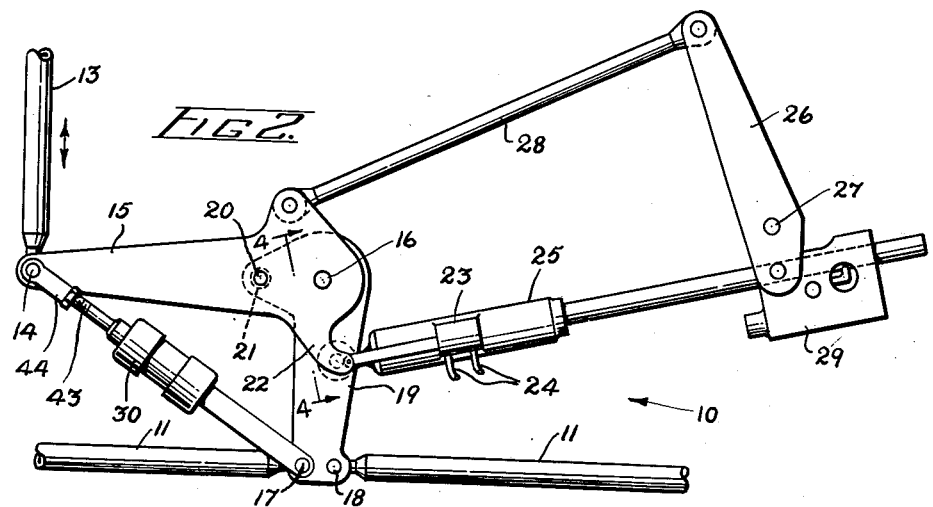
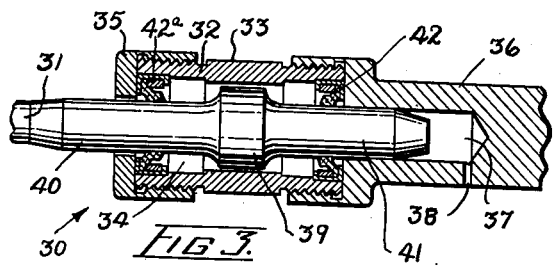
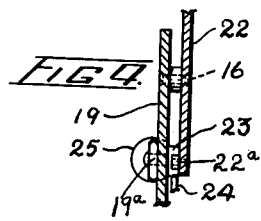
INVENTOR
S.H.E. GARSIDE
PER
ATTORNEY Patented Jan. 1, 1952

2,581,250

UNITED STATES PATENT OFFICE 2,581,250

POWER ASSISTED CONTROL

Samuel Henry Edward Garside, Toronto, Ontario, Canada, assignor to A. V. Roe Canada Limited, Malton, Ontario, Canada, a corporation Application August 28, 1950, Serial No. 181,718

5 Claims. (Cl. 74—471)

This invention relates to improvements in servo mechanisms and in particular to the application of such mechanisms as power boosters in aircraft control installations, though it is by no means confined to such applications and may be beneficially applied to any installation where "hunting" is liable to occur.

In general the application of power boosters in aircraft control installations, to assist the pilot in the operation of the controls, involves a linkage whereby the pilot can move the control surfaces directly by his own efforts in the event of failure of the power booster, such linkage embodying a lost motion device within the range of which the power booster normally operates. In the neutral position of the pilot's controls the linkage is arranged so that the lost motion extends equally in both senses. A small movement of the controls by the pilot, insufficient to take up the available travel in the lost motion device, opens a valve admitting fluid to the appropriate side of the power booster mechanism. (I am here describing the sequence of events in a hydraulic power-assisted installation, though an equivalent sequence is followed in other servo mechanisms using pneumatic or electrical power, and the invention is in no way restricted to the hydraulic servo case.) On admission of fluid under pressure, the hydraulic servo mechanism acts directly upon the linkage connected to the control surfaces and causes the surfaces to move until the lost motion device is again centralized and the valve actuated by the pilot's controls is again closed.

It will be understood that any oscillation of the control surfaces, under aerodynamic or elastic influences, will react, through the servo mechanism upon the controls held by the pilot and at the same time will result in momentary opening and closing of the aforesaid valve through which fluid is supplied to the servo mechanism. This action of the valve will cause intermittent applications of power by the servo mechanism which, in certain circumstances, may be in phase with the oscillations of the control surfaces, causing these oscillations to increase in magnitude to dangerous proportions. This phenomenon is well known to those skilled in the art, who will be familiar with the various types of "follow-up" mechanisms which have been developed to apply corrective influence upon the servo mechanism.

The object of this invention is to eliminate the need for these "follow-up" mechanisms, which are all more or less complicated.

The invention will be more readily understood by reference to the following description and the accompanying drawings which form a part of the description and in which like reference characters designate like parts throughout the same. In the drawings:

Fig. 1 is a top plan view of an aircraft embodying power assisted controls;

Fig. 2 is a plan view of a power assisted control having a damping device constructed in accordance with the invention;

Fig. 3 is a longitudinal cross-sectional view of the damping device; and

Fig. 4 is a cross-sectional view of a portion of the power assisted control, taken on the line 4—4 of Fig. 2.

In the power assisted control shown in Figs. 1, 2 and 3, a power booster mechanism 10 is mounted in the center section of the wing and linked to control rods 11 which operate the ailerons 12. A rod 13 from the pilot's controls (not shown) is pin-jointed at 14 to a driving lever 15 which is pivoted about a fulcrum 16 mounted on the aircraft structure. The rod 13 therefore constitutes the driving portion of the system while the aileron control rods 11 are the driven portion. These aileron control rods are pin-jointed at 17 and 18 to a driven lever 19 which is also pivoted on the fulcrum 16. The two levers 15 and 19 coact through a lost motion mechanism comprising a pin 20 mounted on the driving lever 15 and accommodated in a hole 21 in the driven lever 19, the hole being of materially greater diameter than the pin; the driving lever 15 can thus turn about its fulcrum in either direction by an amount equivalent to the difference between the radius of the pin 20 and the hole 21, without applying any force to the driven lever. An arm 22 of the driving lever 15 is connected by a pin-joint 22a to a simple slide valve 23 through which hydraulic fluid under pressure, supplied through lines 24, is admitted to one side or the other of a double-acting hydraulic jack 25. The valve 23 is formed as an integral part of the cylinder of this jack and the cylinder is connected to the driven lever 19 by a pin-joint 19a. The ram of the jack is anchored at one end to a feed-back lever 26 having its fulcrum 27 on the aircraft structure and having its other end linked to the driving lever 15 by a feed-back arm 28 which provides "feel" to the pilot's control. Thus the anchorage moves in a manner proportional to the movement of the driving lever 15, giving a mechanical advantage to the forces exerted by the pilot through the hydraulic mechanism. In addition a release unit 29 is provided to permit direct mechanical control by the pilot in case of failure of the hydraulic system or of the booster mechanism itself.

The slide valve 23 is adjusted so that no fluid can flow into either side of the jack 25 when the lost motion device is centralized, that is when the pin 20 is located centrally in the hole 21. A small movement of the pilot's controls will decentralize the lost motion device and, by means of the arm 22, will actuate the slide valve; the valve will then allow fluid under pressure to enter the cylinder of the jack on the appropriate side of the piston and the jack will move the power lever until the pin is once again centralized in the hole 21.

The sequence of events in which sudden relative movement between the two levers 15 and 19 may result in "hunting" in the hydraulic servo mechanism has already been described and it is to eliminate this sequence of events that, according to the invention, a damping device 30 serving as a linkage between the two levers 15 and 19 is introduced into the system.

A preferred type of damping device is illustrated in Fig. 3: It comprises a ram 31 slidably mounted within a casing 32. The casing consists of a tubular portion 33 defining a working chamber 34, its ends being closed by a cap 35 and a closure rod 36. Centrally located in the end of the closure rod adjacent the working chamber is a cylindrical guide chamber 37 of uniform cross section and of lesser diameter than the working chamber; a drain port 38 connects this chamber to the exterior of the rod.

The ram 31 comprises a piston 39 with integral piston and guide shafts, 40 and 41 respectively, coaxial with the piston and extending oppositely from the end faces thereof; the diameter of the guide shaft is such that there is a sliding fit between the shaft and the guide chamber 37 while a very slight clearance is similarly provided between the piston and the wall of the working chamber 34. This chamber is filled with hydraulic fluid, care being taken to exclude all air from the system, and sealing rings 42 and 42a are provided at the ends of the chamber to guard against leakage of the fluid.

The end of the piston shaft remote from the piston terminates in a threaded section 43 to which is attached a rod end fitting 44 by means of which the assembly is adjustably attached at 14 to the driving lever 15. The closure rod 36 of the damping assembly is pin-jointed at 17 to the driven lever 19.

Due to the small clearance between the piston 39 and the wall of the working chamber 34 the hydraulic fluid can only escape past the piston slowly in moving from one end of the working chamber to the other, and therefore when an axial load is suddenly applied to the ends of the damping device, the damping device will act as a rigid assembly. The piston is centered in the working chamber by the guide shaft 41 sliding in its chamber 37, and any fluid which might leak past the sealing ring 42 into this chamber and impede the functioning of the assembly is drained off through the port 38.

Any rapid movement of the control surfaces is transmitted directly to the pilot's controls through this damping device, the driven lever and the driving lever moving as a rigid assembly so that the lost motion device is not decentralized and the slide valve is not actuated. Conversely, sudden movements by the pilot are transmitted directly to the control surfaces but gentle movements, as would normally be used in controlling an aircraft are transmitted through the servo mechanism, as described hereinbefore, the damping device yielding to the slow application of load. By this means the normal operation of the power booster is in no way affected, whereas the undesirable "hunting," associated with the application of servo mechanisms to controls susceptible to oscillation, is overcome in a simple manner. The degree of rigidity which the damping device presents to a given sudden load can be controlled by adjusting the clearance between the piston 39 and the wall of the working chamber 34 or by varying the viscosity of the hydraulic fluid and thus regulating the rate at which the hydraulic fluid can escape past the piston.

Although only one embodiment of the invention has been described, it will be apparent to those skilled in the art that the object of the invention will be achieved by any suitable damping device, such as a dash pot or a plastic friction mechanism, which is so constructed and arranged that it is incapable of transmitting load when the load is applied slowly but acts as a rigid connection when the load is applied suddenly. It is to be understood, therefore, that the form of the invention herewith shown and described is to be taken as a preferred example of the same and that various changes may be made in the shape, size and arrangement of the parts without departing from the scope of the subjoined claims.

What I claim as my invention is:

1. A power assisted system for translation of motion, of the kind having a driving portion, a driven portion movable relatively to the driving portion, and a power booster mechanism disposed in series therebetween and actuated by the relative movement between the driving and driven portions, characterized by the provision of a damping device independent of the power booster mechanism and constituting a linkage connected between the driving and driven portions in parallel with the booster mechanism whereby rapid movements originating in one of the portions are transmitted directly to the other portion thus by-passing the power booster mechanism.

2. A power assisted system for translation of motion, of the kind having a driving portion, a driven portion movable relatively to the driving portion, and a power booster mechanism disposed in series therebetween and actuated by the relative movement between the driving and driven portions, characterized by the provision of a damping device independent of the power booster mechanism and constituting a linkage connected between the driving and driven portions in parallel with the booster mechanism whereby rapid movements originating in the driven portion are transmitted directly to the driving portion thus by-passing the power booster mechanism.

3. A power assisted system for translation of motion, of the kind having a driving portion, a driven portion movable relatively to the driving portion, and a power booster mechanism disposed in series therebetween and actuated by the relative movement between the driving and driven portions, characterized by the provision of a damping device independent of the power booster mechanism and constituting a linkage connected between the driving and driven portions in parallel with the booster mechanism and which acts as a substantially rigid structural member under suddenly applied loading but yields under relatively gradually applied loading, whereby rapid movements originating in one of the portions are transmitted directly to the other portion thus by-passing the booster mechanism.

4. A power assisted system for translation of motion, of the kind having a driving portion, a driven portion movable relatively to the driving portion, and a power booster mechanism disposed in series therebetween and actuated by the relative movement between the driving and driven portions, characterized by the provision of a dash pot independent of the power booster mechanism and linking the driving and driven portions in parallel with the booster mechanism whereby rapid movements originating in one of the portions are transmitted directly to the other portion thus by-passing the power booster mechanism.

5. A power assisted system for translation of motion relative to a body from a driving portion to a driven portion, comprising a driving lever pivotally mounted on the body, the driving portion being connected to the driving lever at a point spaced from the pivotal mounting of the driving lever; a driven lever pivotally mounted on the body co-axially with the driving lever for movement relative to the driving lever, the driven portion being connected to the driven lever at a point spaced from the pivotal mounting; a power booster mechanism including a motor member connected to the driven lever, a motor member connected to the body, and a controller, the power booster mechanism being activated by an external source of power for moving the driven lever relative to the body, the controller including a fixed element mounted on the motor member that is connected to the driven lever and an element movable with respect to the fixed element, the motor member of the power booster mechanism on which the controller is mounted being connected to the driven lever at a point spaced from the pivotal mounting, the movable element of the controller being connected to the driving lever at a point spaced from the pivotal mounting and a damping device linking the driving lever and the driven lever in parallel with the booster mechanism whereby rapid movements originating in one of the driving portion and driven portion are transmitted directly to the other of the driving portion and driven portion thus by-passing the power booster mechanism.

SAMUEL HENRY EDWARD GARSIDE.

REFERENCES CITED

The following references are of record in the file of this patent:

UNITED STATES PATENTS

| Number | Name | Date |
| --- | --- | --- |
| 2,385,351 | Davidson | Sept. 25, 1945 |
| 2,406,356 | Davidson | Aug. 27, 1946 |